United States Patent
Goto et al.

(10) Patent No.: US 11,225,998 B2
(45) Date of Patent: Jan. 18, 2022

(54) HALF BEARING AND SLIDING BEARING

(71) Applicant: DAIDO METAL COMPANY LTD., Nagoya (JP)

(72) Inventors: Shiho Goto, Inuyama (JP); Seiji Amano, Inuyama (JP); Ryota Ito, Inuyama (JP)

(73) Assignee: DAIDO METAL COMPANY LTD., Nagoya (JP)

(*) Notice: Subject to any disclaimer, the term of this patent is extended or adjusted under 35 U.S.C. 154(b) by 0 days.

(21) Appl. No.: 17/034,692

(22) Filed: Sep. 28, 2020

(65) Prior Publication Data

US 2021/0095713 A1  Apr. 1, 2021

(30) Foreign Application Priority Data

Sep. 30, 2019 (JP) .............. JP2019-179034

(51) Int. Cl.
  *F16C 9/02* (2006.01)
  *F16C 33/04* (2006.01)
  *F16C 33/10* (2006.01)
  *F16C 17/02* (2006.01)

(52) U.S. Cl.
  CPC .............. *F16C 9/02* (2013.01); *F16C 17/022* (2013.01); *F16C 33/046* (2013.01); *F16C 33/1065* (2013.01)

(58) Field of Classification Search
  CPC .......... F16C 9/02; F16C 17/02; F16C 17/022; F16C 33/046; F16C 33/106; F16C 33/1065; F16C 33/107; F16C 2240/42
  See application file for complete search history.

(56) References Cited

U.S. PATENT DOCUMENTS

2004/0228554 A1* 11/2004 Fujita .................. B23K 26/384
                                                    384/291

FOREIGN PATENT DOCUMENTS

| DE | 102015202561 A1 * | 8/2016 | ............ F16C 33/201 |
| EP | 3825565 A1 * | 5/2021 | |
| JP | S58-149622 U | 10/1983 | |
| JP | H08-277831 A | 10/1996 | |
| JP | 2000-504089 A | 4/2000 | |
| JP | 2008-095721 A | 4/2008 | |
| JP | 2009062996 A * | 3/2009 | .......... F16C 33/1065 |

* cited by examiner

*Primary Examiner* — Alan B Waits
(74) *Attorney, Agent, or Firm* — Snyder, Clark, Lesch & Chung, LLP

(57) ABSTRACT

A semi-cylindrical half bearing for a sliding bearing includes at least one axial groove formed on its inner circumferential surface that includes a smooth groove surface formed back away from the inner circumferential surface toward a radially outer side. The half bearing further includes a plurality of axial narrow grooves and a plurality of circumferential narrow grooves that are formed further back away from the groove surface toward the radially outer side, and extend in circumferential and axial directions, respectively, so as to cross each other. A depth of the axial narrow groove from the groove surface is greater than a depth of the circumferential narrow groove from the groove surface, and a width of the axial narrow groove on the groove surface is greater than a width of the circumferential narrow groove on the groove surface.

9 Claims, 9 Drawing Sheets

(ENLARGED VIEW)

(ENLARGED VIEW)

A-A SECTION

B-B SECTION

B-B SECTION ENLARGED VIEW

A-A SECTION ENLARGED VIEW

HALF BEARING AND SLIDING BEARING

BACKGROUND OF THE INVENTION

(1) Field of the Invention

The present invention relates to a half bearing constituting a sliding bearing for supporting a crankshaft of an internal combustion engine. The present invention also relates to a cylinder-shaped sliding bearing including the half bearing for supporting the crankshaft of the internal combustion engine.

(2) Description of Related Art

A crankshaft of an internal combustion engine is supported, at its journal portion, in a cylinder block bottom part of the internal combustion engine via a main bearing consisting of a pair of half bearings. In order to lubricate the main bearing, lubricating oil discharged by an oil pump is fed from an oil gallery formed in a cylinder block wall into a lubricating oil groove formed along an inner circumferential surface of the main bearing, through a through-hole formed in a wall of the main bearing. A first lubricating oil path is formed to penetrate the journal portion in a diametrical direction thereof, so that openings formed at both ends of the first lubricating oil path communicate with the lubricating oil groove of the main bearing. Further, a second lubricating oil path extending through a crank arm portion is formed so as to branch from the first lubricating oil path in the journal portion, and the second lubricating oil path communicates with a third lubricating oil path formed to penetrate a crankpin in a diametrical direction thereof. Accordingly, the lubricating oil fed from the oil gallery in the cylinder block wall into the lubricating oil groove formed on the inner circumferential surface of the main bearing through the through-hole is supplied also between the crankpin and a slide surface of a connecting rod bearing consisting of a pair of half bearings, from an outlet opening which opens at an end of the third lubricating oil path, through the first lubricating oil path, the second lubricating oil path, and the third lubricating oil path (see JP H08-277831 A, for example). In this way, the oil is supplied between a surface of the crankshaft, and the slide surface of the main bearing and the slide surface of the connecting rod bearing.

Conventionally, in order to reduce seizure damage during sliding of a crankshaft on a sliding bearing such as a main bearing or a connecting rod bearing, there has been suggested to form a plurality of minute depressions on slide surfaces of half bearings constituting the sliding bearing (see JP S58-149622 U, JP 2008-095721 A, and JP 2000-504089 A, for example).

BRIEF SUMMARY OF THE INVENTION

As described in JP S58-149622 U, JP 2008-095721 A, and JP 2000-504089 A, in a conventional half bearing in which a plurality of minute depressions are formed on a slide surface, the motion in which the slide surface of the half bearing and a surface of a crankshaft come close to each other is repeated during operation of an internal combustion engine (particularly, under an operation condition where the crankshaft rotates at high speed), so that oil in the depressions is compressed and becomes high in temperature at the moment when the slide surface and the crankshaft surface come closest to each other. When the oil which has become high in temperature in the depressions flows out to a space between the slide surface of the half bearing and the crankshaft surface, the slide surface rises in temperature and becomes easily seized. Further, there has been a problem that the viscosity of oil decreases, the slide surface and the crankshaft surface become directly in contact with each other, and thereby damage becomes readily caused.

Accordingly, an object of the present invention is to provide a half bearing constituting a sliding bearing for a crankshaft of an internal combustion engine, that hardly causes seizure damage by discharging oil having become high in temperature to the outside during operation of the internal combustion engine.

A half bearing according to the present invention is adapted to configure a sliding bearing for supporting a crankshaft of an internal combustion engine. This half bearing has a semi-cylindrical shape, and includes an inner circumferential surface including a slide surface. The half bearing also includes at least one axial groove formed on the inner circumferential surface. The axial groove includes a smooth groove surface formed back away from the inner circumferential surface toward a radially outer side of the half bearing, and the groove surface forms a convex curve toward the radially outer side in a sectional view perpendicular to the axial direction of the half bearing, and also forms, in a section parallel to the axial direction, a straight line extending in the axial direction. The half bearing further includes, on the groove surface, a plurality of circumferential narrow grooves and a plurality of axial narrow grooves formed back away from the groove surface toward the radially outer side, and the plurality of circumferential narrow grooves and the plurality of axial narrow grooves extend in a circumferential direction and the axial direction of the half bearing, respectively, so as to intersect each other. A depth of each of the axial narrow grooves from the groove surface of the axial groove is greater than a depth of each of the circumferential narrow grooves from the groove surface of the axial groove, and a width of each of the axial narrow grooves on the groove surface of the axial groove is greater than a width of each of the circumferential narrow grooves on the groove surface of the axial groove.

In one embodiment of the present invention, the depth of the axial groove that is the length from the inner circumferential surface to the deepest portion of the groove surface is preferably 2 to 50 μm. The circumferential length of the axial groove is preferably within a range of about 0.5 to 10° as a central angle of the entire inner circumference of the half bearing (e.g. when the inner diameter of the half bearing of the internal combustion engine is φ50 mm, the circumferential length of the axial groove is preferably about 1 to 4 mm).

In one embodiment of the present invention, a depth of each of the circumferential narrow grooves from the groove surface of the axial groove is preferably 0.05 to 3 μm. A width of each of the circumferential narrow grooves on the groove surface of the axial groove is preferably 5 to 85 μm. Further, a pitch of the circumferential narrow grooves is preferably 5 to 100 μm.

In one embodiment of the present invention, a depth of each of the axial narrow grooves from the groove surface of the axial groove is preferably 0.3 to 10 μm. A width of each of the axial narrow grooves on the groove surface of the axial groove is preferably 10 to 150 μm. Further, a pitch of the axial narrow grooves is preferably 10 to 200 μm.

In one embodiment of the present invention, a plurality of the axial grooves may be formed on the inner circumferential surface of the half bearing.

In one embodiment of the present invention, the plurality of axial grooves may be formed on the inner circumferential surface of the half bearing at substantially equal intervals in the circumferential direction.

In one embodiment of the present invention, the axial groove does not reach any of the axial end surfaces of the half bearing, and therefore may not open at any end surface.

The present invention also relates to a cylindrical sliding bearing that includes the half bearing described above, which serves to bear a crankshaft of an internal combustion engine. In other words, this sliding bearing is constituted of a pair of half bearings at least one of which is the half bearing described above.

DETAILED DESCRIPTION OF THE INVENTION

Hereinafter, embodiments of the invention of the present application will be described with reference to the drawings.

Figure 1:
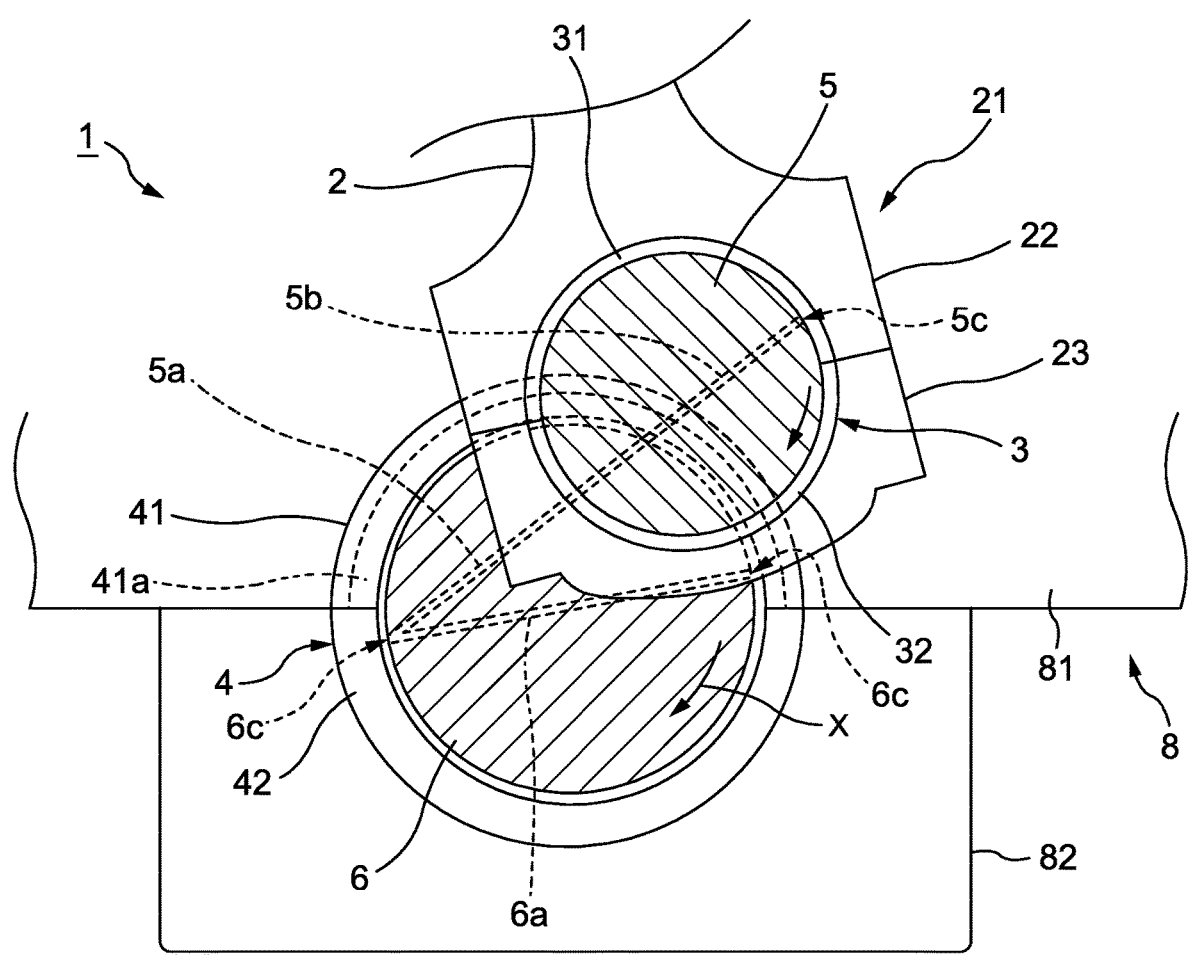
FIG. 1 is a schematic view illustrating a bearing device of a crankshaft of an internal combustion engine.

A bearing device 1 of an internal combustion engine is schematically illustrated in FIG. 1. This bearing device 1 includes a journal portion 6 supported by a bottom part of a cylinder block 8, a crankpin 5 which is formed integrally with the journal portion 6 and thus rotates around the journal portion 6, and a connecting rod 2 which transmits reciprocal motion from the internal combustion engine to the crankpin 5. The bearing device 1 further includes, as sliding bearings which supports a crankshaft, a main bearing 4 which rotatably supports the journal portion 6 and a connecting rod bearing 3 which rotatably supports the crankpin 5.

It should be noted that the crankshaft includes a plurality of journal portions 6 and a plurality of crankpins 5, but herein, one journal portion 6 and one crankpin 5 are illustrated and described for convenience of explanation. In FIG. 1, regarding a positional relationship in a depth direction of its drawing paper, the journal portion 6 is located on the far side of the paper surface, and the crankpin 5 is located on the near side thereof.

The journal portion 6 is supported by a cylinder block bottom part 81 of the internal combustion engine via the main bearing 4 configured by a pair of half bearings 41 and 42. In the half bearing 41 on the upper side in FIG. 1, an oil groove 41a is formed over the entire length of the inner circumferential surface. The journal portion 6 has a lubricating oil path 6a formed to penetrate in the radial direction, and when the journal portion 6 rotates in an arrow X direction, inlet openings 6c at both ends of the lubricating oil path 6a alternately communicate with the oil groove 41a of the main bearing 4.

The crankpin 5 is supported by a large-end housing 21 of the connecting rod 2 (configured by a rod-side large-end housing 22 and a cap-side large-end housing 23), via the connecting rod bearing 3 configured by a pair of half bearings 31 and 32.

A second lubricating oil path 5a branching from the first lubricating oil path 6a of the journal portion 6 and passing through a crank arm portion (not illustrated) is formed, and the second lubricating oil path 5a communicates with a third lubricating oil path 5b formed to penetrate in the radial direction B of the crankpin 5.

Therefore, as described above, lubricating oil discharged from an oil pump is fed into the oil groove 41a formed along the inner circumferential surface of the main bearing 4, from an oil gallery formed in a cylinder block wall through a through-hole formed in a wall of the main bearing 4, and supplied to a space formed between the journal portion 6 and the main bearing 4.

On the other hand, the lubricating oil is also supplied to a space formed between the crankpin 5 and the connecting rod bearing 3 from an outlet 5c located at the end of the third lubricating oil path 5b through the first lubricating oil path 6a, the second lubricating oil path 5a, and the third lubricating oil path 5b.

Figure 2:
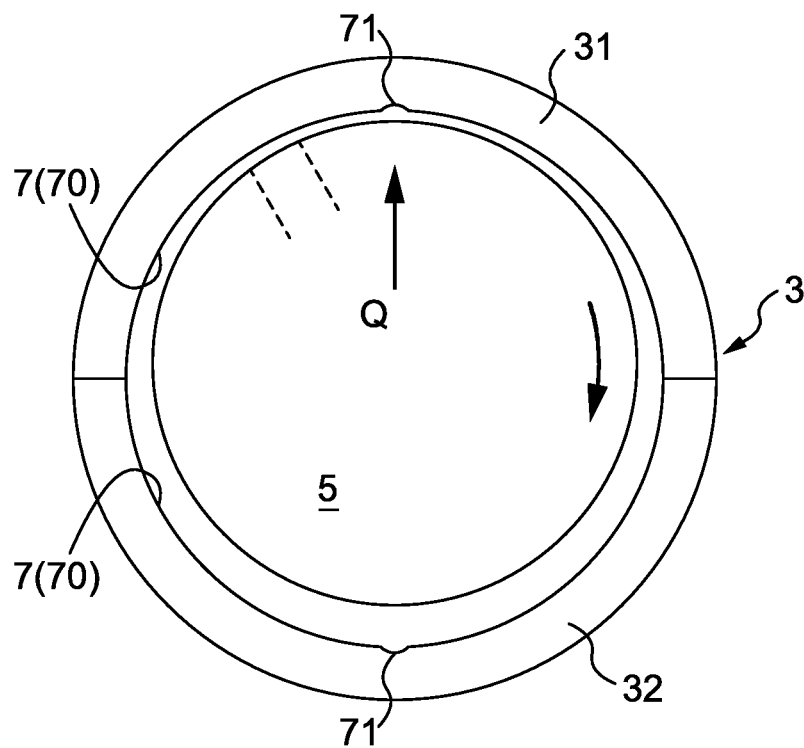
FIG. 2 is a view illustrating movement of a crankpin relative to a pair of half bearings.

In general, the main bearing 4 and the connecting rod bearing 3 bear a dynamic load from the crankshaft by generating pressure in oil between the slide surfaces of the bearings and the crankshaft surfaces (the surfaces of the journal portion 6 and the crankpin 5). During the operation of the internal combustion engine, the magnitude and direction of the load on the slide surfaces of the main bearing 4 and the connecting rod bearing 3 vary all the time, and the central axes of the journal portion 6 and the crankpin 5 move while decentering relative to the bearing central axes of the main bearing 4 and the connecting rod bearing 3 so as to generate oil film pressure balancing with the load. Thus, a bearing clearance (a space between the crankshaft surface and the slide surface) of the main bearing 4 and the connecting rod bearing 3 always changes at any position of the slide surface. For example, in a four-cycle internal combustion engine, the load on the connecting rod bearing 3 and the main bearing 4 is maximized in a combustion stroke. In this combustion stroke, as shown in FIG. 2, the crankpin 5 supported by the connecting rod bearing 3 moves in a direction (arrow Q) toward a slide surface 70 near the circumferential central portion of the half bearing 31 on the upper side of the paper surface, whereby the surface of the crankpin 5 comes closest to the slide surface 70 near the circumferential central portion of the half bearing 31, and a load is applied in this movement direction.

It should be noted that in the main bearing 4 being in a combustion stroke, the load is applied in a direction toward the slide surface near the circumferential central portion of the half bearing 42 set in a bearing cap 82 on the lower side of the paper surface illustrated in FIG. 1, and the surface of the journal portion 6 comes closest to the slide surface near the circumferential central portion of the half bearing 42 on the lower side.

In a half bearing according to a conventional technique in which a plurality of minute depressions are formed on a slide surface, the slide surface of the half bearing having the minute depressions and a crankshaft surface move so as to relatively come close to each other from a separated state. When the surfaces come closest to each other, oil in the depressions is compressed and becomes high in pressure, and thus high in temperature, and flows out into a space between the slide surface and the crankshaft surface. Thus, the temperature of the slide surface rises, and seizure is easily caused. Further, due to decrease in the viscosity of the oil, the slide surface and the crankshaft surface directly contact with each other, and damage is more likely to be caused.

The present invention copes with such a problem of the conventional technique. The embodiments in which the half bearing according to the present invention is applied to a connecting rod bearing are described below. However, it will be appreciated that the half bearing according to the present invention is not exclusively applied to a connecting rod bearing, and may be applied to a main bearing.

Both of a pair of half bearings constituting the connecting rod bearing 3 or the main bearing 4 may be the half bearings according to the invention, or one of the pair of half bearings may be the half bearing according to the invention while the other may be a conventional half bearing having no axial groove on a slide surface.

First Embodiment

Figure 3:
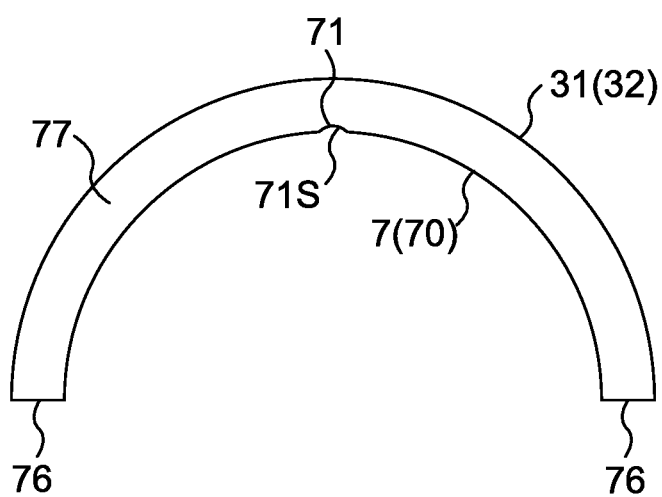
FIG. 3 is a view in which a half bearing according to a first embodiment of the present invention is seen from an axial direction.

FIG. 3 is a view in which a first embodiment of the half bearings 31 and 32 according to the present invention is seen from the axial direction. The connecting rod bearing 3 is configured by bringing circumferential end surfaces 76 of the half bearings 31 and 32 into abutment with each other, and combining the half bearings 31 and 32 into a cylindrical shape as a whole. In the present embodiment, a cylindrical inner circumferential surface 7 includes the slide surface 70.

As illustrated in FIGS. 2 and 3, the wall thickness of the half bearings 31 and 32 is preferably constant along the circumferential direction. However, the wall thickness may be maximum in the circumferential central portion, and continuously decrease toward both circumferential end surfaces 76.

Figure 4:
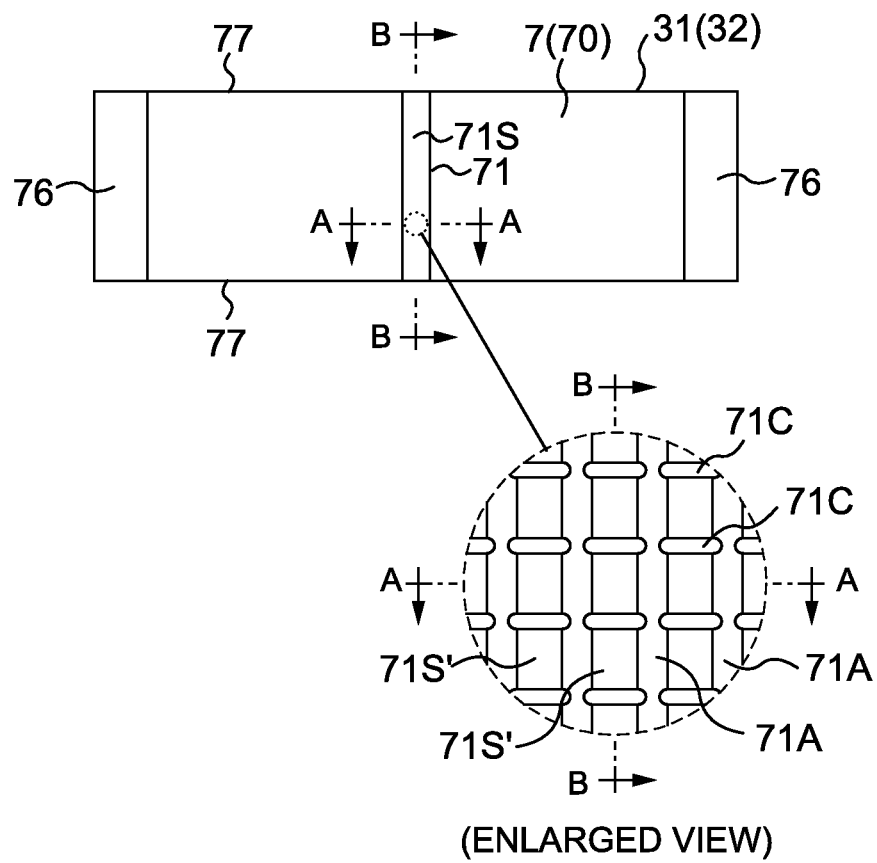
FIG. 4 is a plan view in which the half bearing illustrated in FIG. 2 is seen from an inner circumferential surface side, and an enlarged view of a groove surface of an axial groove.

FIG. 4 is a view in which each of the half bearings 31 and 32 having one axial groove 71 disposed on the slide surface 70 is seen from the slide surface 70 side. However, the present invention is not limited to this embodiment. For example, a plurality of axial grooves 71 may be formed in the axial direction of the slide surface 70. It should be noted that, for ease of understanding, the axial grooves 71 are drawn non-scale in each drawings.

As illustrated in FIGS. 3 and 4, the axial groove 71 has a smooth groove surface 71S back away from the slide surface 70 toward the radially outer side. As illustrated in the enlarged view of FIG. 4, in the groove surface 71S, there are formed a plurality of circumferential narrow grooves 71C extending in the circumferential direction of each of the half bearings 31 and 32, and a plurality of axial narrow grooves 71A extending in the axial direction. Therefore, it will be appreciated that the extension direction of each of the circumferential narrow grooves 71C is perpendicular to the extension direction of each of the axial narrow grooves 71A.

It should be noted that the plurality of circumferential narrow grooves 71C extend in a direction parallel to the circumferential direction of each of the half bearings 31 and 32, but are permitted to slightly tilt (1° at the maximum) relative to the circumferential direction. Similarly, the plurality of axial narrow grooves 71A extend in a direction parallel to the axial direction of each of the half bearings 31 and 32, but are permitted to slightly tilt (1° at the maximum) relative to the axial direction.

Each of the circumferential narrow grooves 71C preferably extends from an edge of the axial groove 71 to an opposite edge, and each of the axial narrow grooves 71A preferably extends from one axial end surface 77 of each of the half bearings 31 and 32 to the other axial end surface 77.

Figure 5:
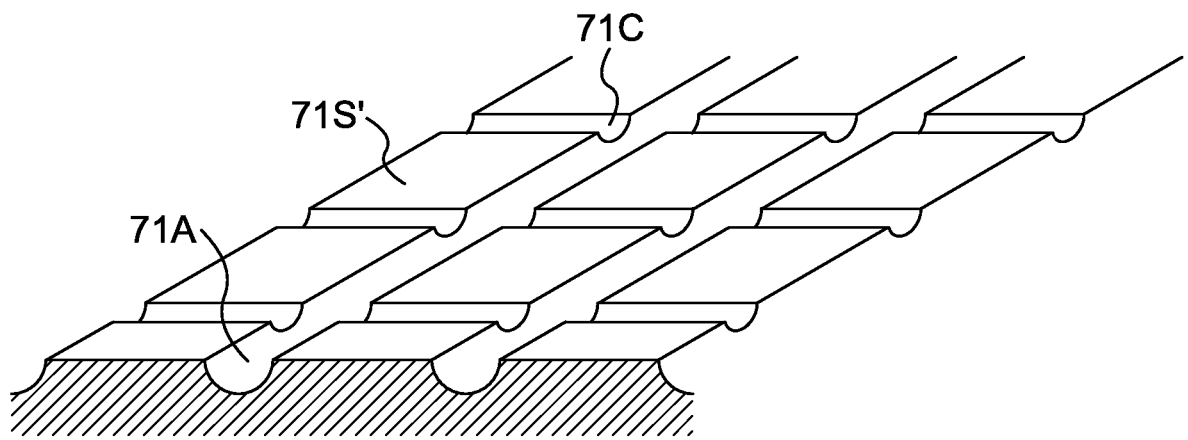
FIG. 5 is a schematic perspective view illustrating the groove surface in an enlarged form.

FIG. 5 is a schematic perspective view illustrating the groove surface 71S in an enlarged manner. As will be appreciated, the smooth groove surface 71S of the axial groove 71 comprises a plurality of small surfaces 71S' formed between the plurality of circumferential narrow grooves 71C and the plurality of axial narrow grooves 71A, and therefore the groove surface 71S and the plurality of circumferential narrow grooves 71C are alternately disposed along line B-B illustrated in FIG. 4. Similarly, the groove surface 71S and the plurality of axial narrow grooves 71A are alternately disposed along line A-A illustrated in FIG. 4. Each of the small surfaces 71S' is a smooth surface having no groove or protrusion formed thereon, but may have a minute depression and projection (that are sufficiently small as compared with the circumferential narrow grooves and the axial narrow grooves) present thereon.

Figure 6:
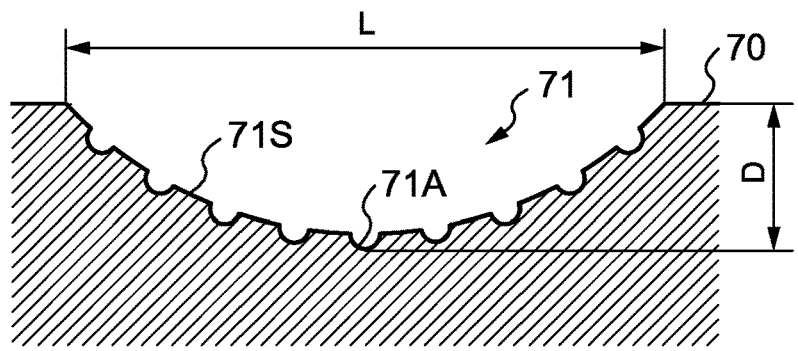
FIG. 6 is a circumferential sectional view of the axial groove along line A-A of FIG. 4.
Figure 7:
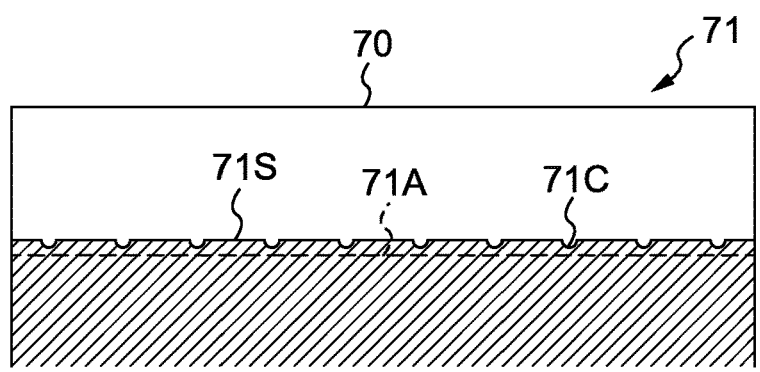
FIG. 7 is an axial sectional view of the axial groove along line B-B of FIG. 4.

FIG. 6 is an enlarged view of the A-A section of the axial groove 71 illustrated in FIG. 4. FIG. 7 is an enlarged view of the B-B section of the axial groove illustrated in FIG. 4. A depth D of the axial groove 71 from the slide surface 70 illustrated in FIG. 6 (a depth from the slide surface 70 adjacent to the axial groove 71 to the deepest portion of the axial narrow groove 71A) is preferably 2 to 50 µm, and more preferably 2 to 25 µm. A circumferential length L of the axial groove 71 is preferably within an extent of about 0.5 to 10° of the central angle with respect to the entire inner circumference of the half bearing 31 (for example, when the inside diameter of the half bearing of the internal combustion engine is φ50 mm, the circumferential length L of the axial groove 71 is preferably about 1 to 4 mm).

When the depth D of the axial groove 71 is too small, the quantity of high-temperature oil discharged to the outside of the bearing is also too small. On the contrary, when the depth D is too great, the quantity of oil discharged to the outside of the bearing is also too great, and thereby the oil supply to the slide surface becomes extremely reduced. When the circumferential length L of the axial groove 71 is too short, the quantity of high-temperature oil discharged to the outside of the bearing is too small. On the contrary, when the circumferential length L of the axial groove 71 is too long, the quantity of oil discharged to the outside of the bearing is too great, and the oil supply to the slide surface becomes extremely reduced.

Figure 8:
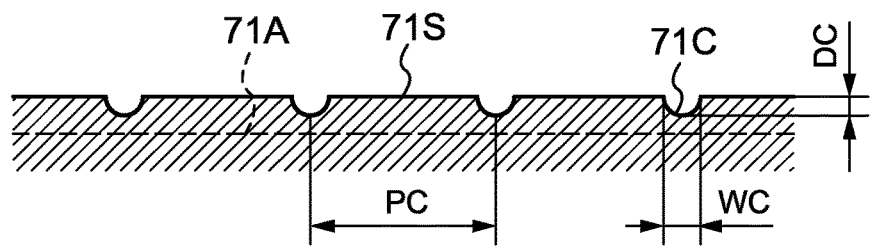
FIG. 8 is an enlarged sectional view illustrating FIG. 7 in an enlarged form.

FIG. 8 is an enlarged view of the B-B section of the axial groove 71 illustrated in FIG. 7. A depth DC of the circumferential narrow groove 71C illustrated in FIG. 8 (a depth from the groove surface 71S adjacent to the circumferential narrow groove 71C to the deepest portion of the circumferential narrow groove 71C in a section perpendicular to the longitudinal direction of the circumferential narrow groove 71C) is preferably 0.05 to 3 µm. The depth DC of the circumferential narrow groove 71C is made smaller than the depth D of the axial groove 71.

A width WC of the circumferential narrow groove 71C (the axial length of the circumferential narrow groove 71C on the groove surface 71S) is preferably 5 to 85 µm. Further, an axial pitch PC of the circumferential narrow grooves 71C on the groove surface 71S of the axial groove 71 (an axial distance between the deepest portions of the adjacent circumferential narrow grooves 71C) is preferably 5 to 100 µm.

When the depth DC or the width WC of the circumferential narrow groove 71C is out of the dimensional range described above and too small, the oil flowing from the circumferential narrow groove 71C during the low-speed to medium-speed rotation of a crankshaft of an internal combustion engine is extremely reduced, and the oil supply to the slide surface 70 becomes insufficient. On the contrary, when the depth DC or the width WC is too great, the high-temperature oil in the axial groove 71 is fed to the slide surface 70 in great quantity during the high-speed rotation of the crankshaft of the internal combustion engine, and discharge of the oil to the outside becomes difficult.

Figure 9:
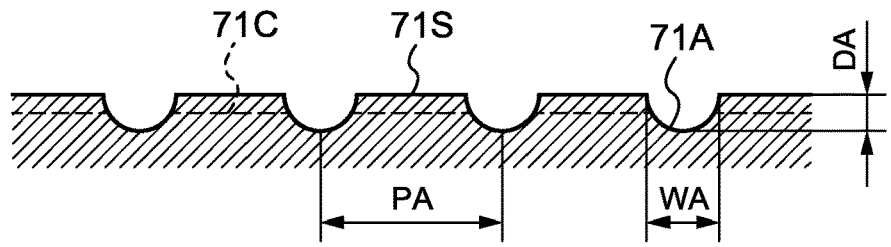
FIG. 9 is an enlarged sectional view illustrating FIG. 6 in an enlarged form.

FIG. 9 is an enlarged view of the A-A section of the axial groove 71 illustrated in FIG. 6. A depth DA of the axial narrow groove 71A illustrated in FIG. 9 (a depth from the groove surface 71S adjacent to the axial narrow groove 71A to the deepest portion of the axial narrow groove 71A in a section perpendicular to the longitudinal direction of the axial narrow groove 71A) is preferably 0.3 to 100 µm. The depth DA of the axial narrow groove 71A is made smaller than the depth D of the axial groove 71.

A width WA of the axial narrow groove 71A (the circumferential length of the axial narrow groove 71A on the groove surface 71S) is preferably 10 to 150 µm. Further, a circumferential pitch PA of the axial narrow grooves 71A on the groove surface 71S of the axial groove 71 (a circumferential distance between the deepest portions of the adjacent axial narrow grooves 71A) is preferably 10 to 200 µm.

When the depth DA or the width WA of the axial narrow groove 71A is out of the dimensional range described above and too small, discharge of the high-temperature oil in the axial groove 71 to the outside becomes difficult during the high-speed rotation of the crankshaft of the internal combustion engine, and the oil is fed to the slide surface 70. On the contrary, when the depth DA or the width WA is too great, the oil in the axial groove 71 is discharged to the outside too much during the low-speed to medium-speed rotation of the crankshaft of the internal combustion engine, and the oil supply to the slide surface 70 becomes insufficient.

The groove surface 71S (the surface of the axial groove excluding the circumferential narrow groove and the axial narrow groove) describes a curve expanding toward the radially outer side of each of the half bearings 31 and 32, i.e., a radially outwardly convex curve, in a section (the A-A section in FIG. 4) perpendicular to the axial direction of each of the half bearings 31 and 32 (see FIG. 6). It should be noted that the circumferential narrow groove 71C and the axial narrow groove 71A are formed also to expand to the radially outer side of each of the half bearings 31 and 32 in a section perpendicular to the axial direction of each of the half bearings 31 and 32. In the cross-section (the B-B section in FIG. 4) parallel to the axial direction of each of the half bearings 31 and 32, the groove surface 71S describes a straight line which is located back away from the slide surface 70 toward the radially outer side of the half bearings 31 and 32, and extends in the axial direction (see FIG. 7).

When the pitch PC of the circumferential narrow grooves 71C and the pitch PA of the axial narrow grooves 71A are out of the dimensional range described above and too great, and the width WC of the circumferential narrow groove 71C and the width WA of the axial narrow groove 71A are too small, the smooth groove surface 71S becomes extremely large. In this case, pressure is generated in oil on the groove surface 71S when the slide surface 70 and the crankpin 5 come closest to each other. Regardless, since the width WC of the circumferential narrow groove 71C is small, the oil supply to the slide surface 70 becomes small during the low-speed to medium-speed rotation of the crankshaft. Moreover, since the width WA of the axial narrow groove 71A is small, the discharge quantity of the oil which has become high in temperature during the high-speed rotation of the crankshaft becomes small Thus, when the groove surface 71S becomes extremely large, the slide surface 70 and the crankpin 5 more easily come into direct contact with each other.

On the contrary, when the pitch PC of the circumferential narrow grooves 71C and the pitch PA of the axial narrow grooves 71A are out of the dimensional range described above and too small, and the width WC of the circumferential narrow groove 71C and the width WA of the axial narrow groove 71A are too great, the smooth groove surface 71S becomes extremely small. In this case, the range in which the pressure is generated is small, bearing of the crankpin 5 becomes insufficient, and therefore, the slide surface 70 and the crankpin 5 more easily come into direct contact with each other.

When there is no groove surface 71S (the axial narrow grooves 71A are disposed so as to directly range in the circumferential direction, and/or the circumferential narrow grooves 71C are disposed so as to directly range in the axial direction), the oil is not easily compressed in the axial groove 71, and the pressure is not easily generated, during the closest contact between the slide surface 70 and the crankpin 5. Therefore, the slide surface 70 and the crankpin 5 more easily come into direct contact with each other.

In the present embodiment, the axial narrow groove 71A is formed in such a way that the depth DA thereof from the groove surface 71S of the axial groove 71 is constant along the extension direction (longitudinal direction) of the axial narrow groove 71A, and the width WA is constant along the extension direction of the axial narrow groove 71A. It should be noted that the sectional shape of the axial narrow groove 71A is preferably a U-shape (see FIG. 9), but is not limited to the U-shape, and may have any other shape.

However, the depth DA or the width WA of the axial narrow groove 71A may varies along the extension direction of the axial narrow groove 71A. In this case, the depth DA and the width WA of the axial narrow groove 71A are defined by the maximum groove depth and the maximum groove width as described above, and these maximum values are preferably within the dimensional range described above.

In the present embodiment, the circumferential narrow groove 71C is formed in such a way that the depth DC thereof from the groove surface 71S of the axial groove 71 is constant along the extension direction (longitudinal direction) of the circumferential narrow groove 71C except for a circumferential end, and the width WC is constant along the extension direction of the circumferential narrow groove 71C. It should be noted that the sectional shape of the circumferential narrow groove 71C is also preferably a U-shape (see FIG. 8), but is not limited to the U-shape, and may have any other shape.

However, the depth DC or the width WC of the circumferential narrow groove 71C may vary along the extension direction of the circumferential narrow groove 71C. In this case, the depth DC and the width WC of the circumferential narrow groove 71C are defined by the maximum groove depth and the maximum groove width of the circumferential narrow groove 71C as described above, and these maximum values are preferably within the dimensional range described above.

The connecting rod bearing 3 according to the present embodiment is formed by bringing the circumferential end surfaces 76 of the pair of half bearings into abutment with each other, and combining the half bearings into a cylinder shape as a whole. Both of the pair of half bearings are preferably the half bearings 31 and 32 according to the present invention, but only one of the pair of half bearings may be the half bearing 31 or 32 according to the present invention. Each of the half bearings 31 and 32 may have a slide layer which is a Cu bearing alloy or an Al bearing alloy. Alternatively, each of the half bearings 31 and 32 may have a slide layer of a Cu bearing alloy or an Al bearing alloy on a back metal layer made of an Fe alloy. A surface portion made of one kind of metal selected from the group consisting of Bi, Sn, and Pb softer than a bearing alloy, or an alloy including these metals as main constituents, or a surface portion made of a resin composition including synthetic resin as a main constituent may be provided on the slide surface 70 and the groove surface 71S (the surface of the slide layer) on the cylindrically-shaped inner circumferential surface. However, the groove surface 71S of the axial groove 71 preferably has no such surface portion. This is because when the groove surface 71S of the axial groove 71, or the surfaces of the circumferential narrow groove 71C and the axial narrow groove 71A are soft, plastic deformation, excessive elastic deformation or the like occurs in the smooth groove surface 71S of the axial groove 71, so that sufficient oil pressure is not generated, and the slide surface 70 and the crankpin 5 more easily come into contact with each other.

As described above, in the half bearing according to the present invention, the axial groove 71 having the smooth groove surface 71S is formed on the slide surface 70, and the plurality of circumferential narrow grooves 71C and the plurality of axial narrow grooves 71A are formed on the groove surface 71S. The reason that seizure damage is reduced by this half bearing is described below.

Figure 10:
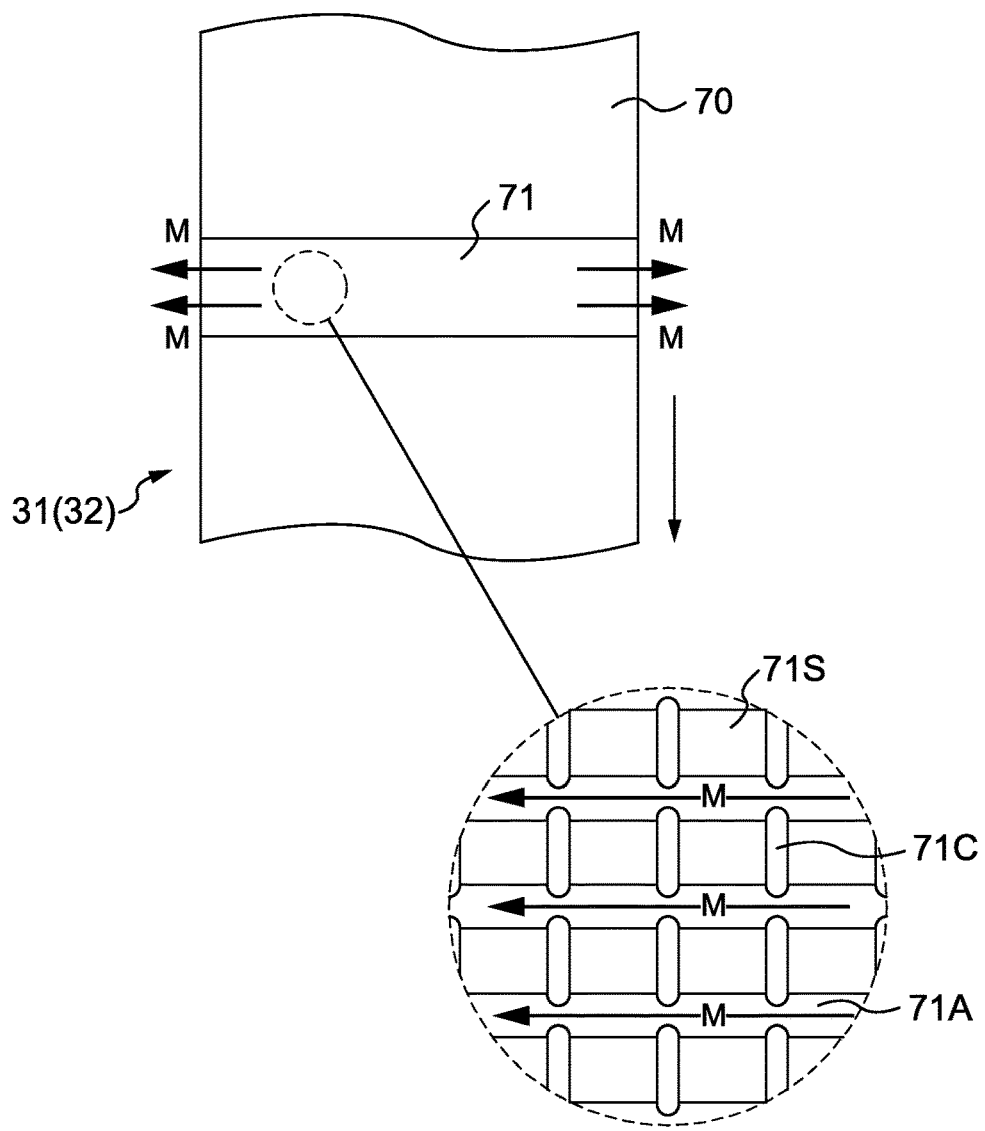
FIG. 10 is a view illustrating the flow of oil in the axial groove during high-speed rotation of the crankshaft.

In an operation condition where a crankshaft of an internal combustion engine rotates at high speed, the slide surface 70 of the half bearing 31 having the axial groove 71 and the surface of the crankpin 5 act to relatively come close to each other from a separated state. FIG. 2 illustrates a state in which the slide surface 70 and the surface of the crankpin 5 come closest to each other. In this instance, oil in the axial groove 71 is compressed and becomes high in pressure, therefore, high in temperature, but the high-temperature oil is guided to the axial narrow groove 71A formed on the surface of the axial groove 71, and then mostly discharged to the outside in the axial direction, as indicated by arrows M in FIG. 10 in which the half bearing 31, 32 is seen from the inner circumferential surface side thereof.

Thus, the high-temperature oil does not flow out to the slide surface 70, a temperature rise of the slide surface 70 can be restrained, and therefore, seizure damage can be reduced. In this instance, the depth of the axial narrow groove 71A needs to be greater than the depth of the circumferential narrow groove 71C. If the circumferential narrow groove 71C is deeper than the axial narrow groove 71A, oil that has become high in temperature in the axial groove 71 is guided to the circumferential narrow groove 71C, flows to the slide surface, and is not easily discharged to the outside. Thus, in order for oil to be guided to the axial narrow groove 71A, and easily discharged to the outside, the relation: the depth of the axial narrow groove 71A>the depth of the circumferential narrow groove 71C is needed.

Figure 11:
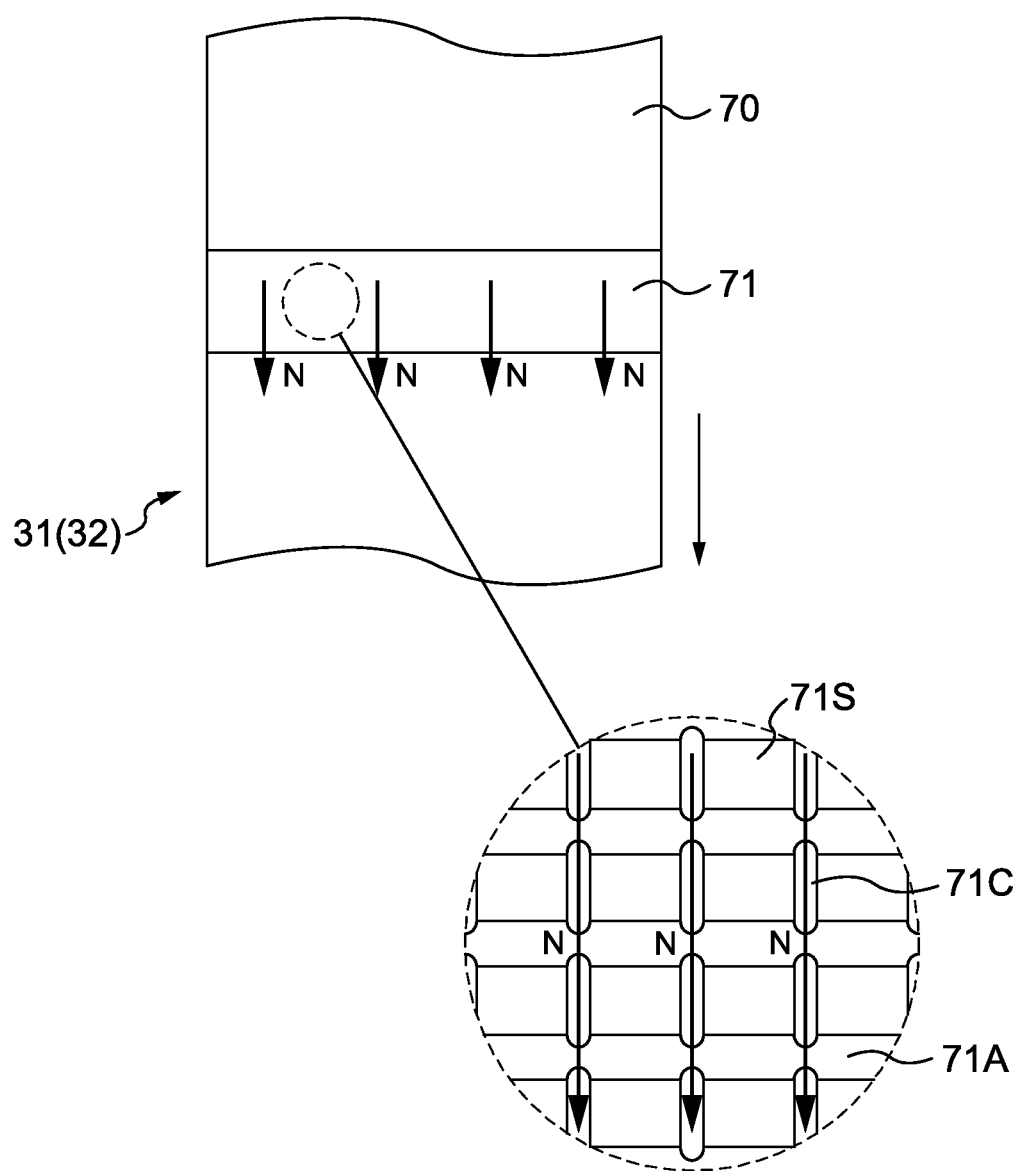
FIG. 11 is a view illustrating the flow of oil in the axial groove during low-speed to medium-speed rotation of the crankshaft.

In a (normal) operation condition of the internal combustion engine where the crankshaft rotates at low speed or medium speed, a clearance between the slide surface 70 and the surface of the crankpin 5 is large even during an action in which the slide surface 70 and the surface of the crankpin 5 come close to each other, and oil in the axial groove 71 does not become high in temperature. In this instance, the circumferential narrow groove 71C is also formed on the groove surface 71S of the axial groove 71, and therefore serves as resistance to the outward discharge of oil at the axial end of the axial groove 71, and the oil is guided to the circumferential narrow groove 71C and then fed to the slide surface 70, as indicated by arrows N in FIG. 11. Therefore, enough oil is supplied to the slide surface 70, which can make it difficult to cause seizure damage.

When the axial groove 71 only includes the groove surface 71S, or when only the axial narrow groove 71A is formed in the groove surface 71S, and the circumferential narrow groove 71C is not formed, oil is also discharged to the outside by the axial groove 71 during an action in which the slide surface 70 and the surface of the crankpin 5 come close to each other in a (normal) operation condition of the internal combustion engine where the crankshaft rotates at low speed or medium speed.

When only the circumferential narrow groove 71C is formed on the groove surface 71S of the axial groove 71, and the axial narrow groove 71A is not formed, oil that has become high in temperature in the axial groove 71 in an operation condition of the internal combustion engine where the crankshaft continuously rotates at high speed is fed to the slide surface side by the circumferential narrow groove 71C, and discharge of the oil to the outside becomes difficult.

When the circumferential narrow groove 71C is deeper than the axial narrow groove 71A, oil that has become high in temperature in the axial groove 71 is guided to the circumferential narrow groove 71C and thus flows to the slide surface, and is therefore not easily discharged to the outside.

The axial groove 71 has the smooth groove surface 71S, and thus oil in the axial groove 71 is compressed and becomes high in pressure the instance that the slide surface 70 and the surface of the crankpin 5 come closest to each other. However, oil that has become instantaneously high in pressure in the axial groove 71 prevents the slide surface 70 adjacent to the axial groove 71 and the surface of the crankpin 5 from directly contacting each other.

Second Embodiment

Another non-limited embodiment of the present invention is described below.

Figure 12:
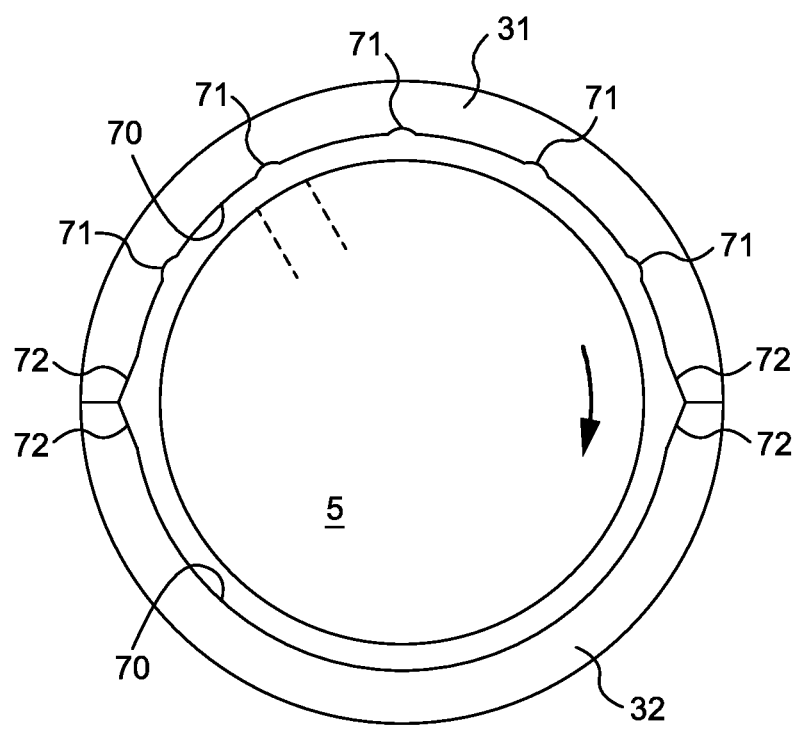
FIG. 12 is a view in which a pair of half bearings according to a second embodiment of the present invention and the crankpin are seen from the axial direction.
Figure 13:
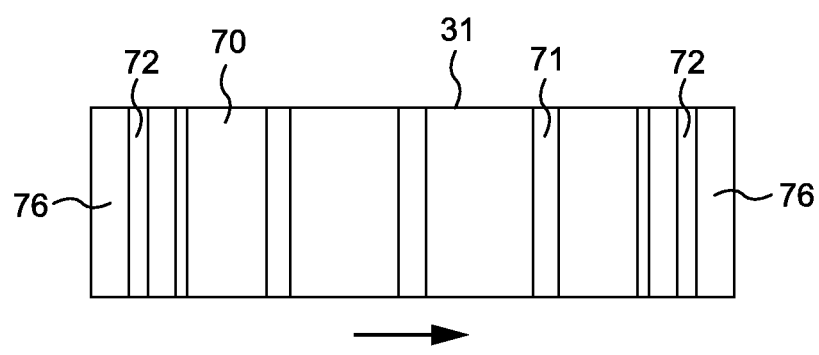
FIG. 13 is a plan view in which the half bearing illustrated in FIG. 12 is seen from the inner circumferential surface side.

FIGS. 12 and 13 illustrate the half bearing 31 in which a plurality of axial grooves 71 are provided over the entire inner circumferential surface. The inner circumferential surface 7 of each of the half bearings 31 and 32 includes the slide surface 70, and a crush relief 72 formed adjacent to each of both circumferential end surfaces 76. Other components are the same as those of the half bearings 31 and 32 already described.

In this embodiment, the plurality of axial grooves 71 having the same shape and dimension are provided at substantially equal intervals in substantially the entire inner circumferential surface 7. It should be noted that FIG. 13 is a plan view in which the semi-cylindrical half bearing 31 is seen from the inner circumferential surface side, and thus, the shape of the axial groove 71 near the circumferential end surface 76 is drawn in a distorted form. In FIG. 13, the circumferential narrow groove 71C and the axial narrow groove 71A are omitted, and thus not illustrated.

The crush relief 72 means a surface formed by reducing the thickness of a wall portion from the original slide surface 70 in the radial direction in a circumferential end region of each of the half bearings 31 and 32. For example, the crush relief 72 is formed in order to absorb displacement or deformation of the circumferential end surface 76 of the half bearings 31 and 32 that can occur when the pair of half bearings 31 and 32 are set to the connecting rod 2. Therefore, the curvature center position of the surface of the crush relief 72 is different from the curvature center position of other regions of the slide surface 70 (see SAE J506 (item 3.26 and item 6.4), DIN1497, section 3.2, JIS D3102). Generally, in the case of a bearing of a small internal combustion engine for a passenger car, the depth of the crush relief 72 (the distance from the original slide surface to the crush relief 72) on the circumferential end surface of a half bearing is approximately 0.01 to 0.05 mm.

In a high-rotation type engine among four-cycle internal combustion engines, a crankshaft tends to whirl, and the slide surface 70 and the surface of the crankpin 5 come close to each other over the entire circumference of the half bearings 31 and 32, easily resulting in direct contact. Since the axial groove 71 of each of the half bearings 31 and 32 according to the present embodiment is provided over the entire circumference of the half bearing 31, there are more places where oil that has become high in temperature in the axial groove 71 is discharged, even in an operation condition of the internal combustion engine where the crankshaft continuously rotates at high speed. Therefore, a temperature rise of the slide surface 70 can be restrained, and it becomes difficult for the slide surface 70 of the half bearing 31 and the surface of the crankpin 5 to directly contact each other.

It should be noted that the formation range of the axial groove 71 is not limited to only a range near the circumferential central portion of the inner circumferential surface 7 of the half bearing 31, and the axial groove 71 may be formed in any circumferential range. Moreover, the axial groove 71 may be formed in the crush relief 72. Although five axial grooves 71 are drawn in FIGS. 12 and 13, the present invention is not limited thereto.

Third Embodiment

Figure 14:
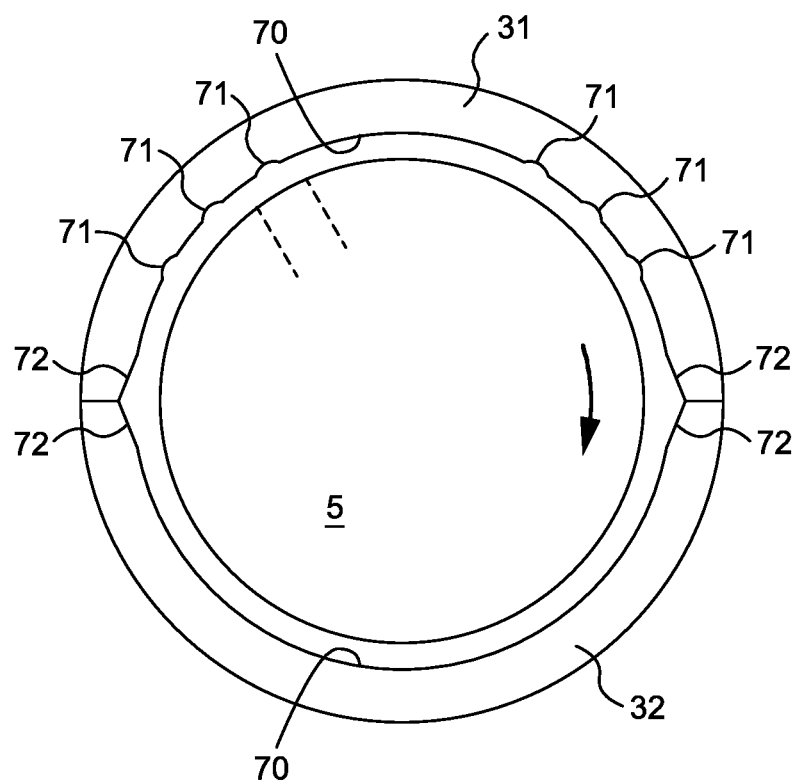
FIG. 14 is a view in which a pair of half bearings according to a third embodiment of the present invention and the crankpin are seen from the axial direction.
Figure 15:
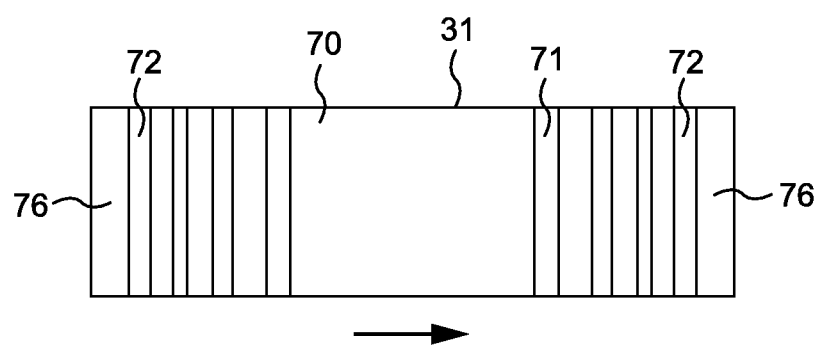
FIG. 15 is a plan view in which the half bearing illustrated in FIG. 14 is seen from the inner circumferential surface side.

FIGS. 14 and 15 illustrate the half bearing 31 in which a plurality of axial grooves 71 are provided in a part of the inner circumferential surface in the circumferential direction. The inner circumferential surface 7 of each of the half bearings 31 and 32 includes the slide surface 70, and the crush relief 72 formed adjacent to both of the circumferential end surfaces 76. Other components are the same as those of the half bearings 31 and 32 already described. It should be noted that in FIG. 14, the circumferential narrow groove 71C and the axial narrow groove 71A are omitted, or not illustrated.

In this embodiment, the plurality of axial grooves 71 having the same shape and dimension are provided in a part of the inner circumferential surface 7 in the circumferential direction. It should be noted that FIG. 15 is a plan view in which the semi-cylindrical half bearing 31 is seen from the inner circumferential surface side, and thus, the shape of the axial groove 71 near the circumferential end surface 76 is drawn in a distorted form.

In the half bearing 31 according to the present embodiment, the plurality of axial grooves 71 are provided in a part of the inner circumferential surface 7, and therefore, there are more places where oil that has become high in temperature in the axial groove 71 is discharged, even in an operation condition of an internal combustion engine where a crankshaft continuously rotates at high speed. Therefore, a temperature rise of the slide surface 70 can be restrained. Moreover, as compared with the case where the axial groove 71 is formed over the entire circumference of the inner circumferential surface 7, the capability of supporting the crankpin 5 by the slide surface 70 is high. Therefore, it becomes difficult for the slide surface 70 of the half bearing 31 and the surface of the crankpin 5 to directly contact each other.

It should be noted that in the case of an internal combustion engine having a specification in which a part closer to the circumferential central portion of the inner circumferential surface 7 of each of the half bearings 31 and 32 more easily contact the surface of the crankpin 5 during the operation, the plurality of axial grooves 71 may be disposed close to the circumferential central portion of the inner circumferential surface 7 of the half bearing 31, in contrast to the present embodiment.

As described above, the position and number of the axial grooves 71 can be changed depending on the specification of an internal combustion engine. The axial grooves 71 may be formed in the crush relief 72. Although six axial grooves 71 are drawn in FIGS. 14 and 15, the present invention is not limited thereto.

Fourth Embodiment

Figure 16:
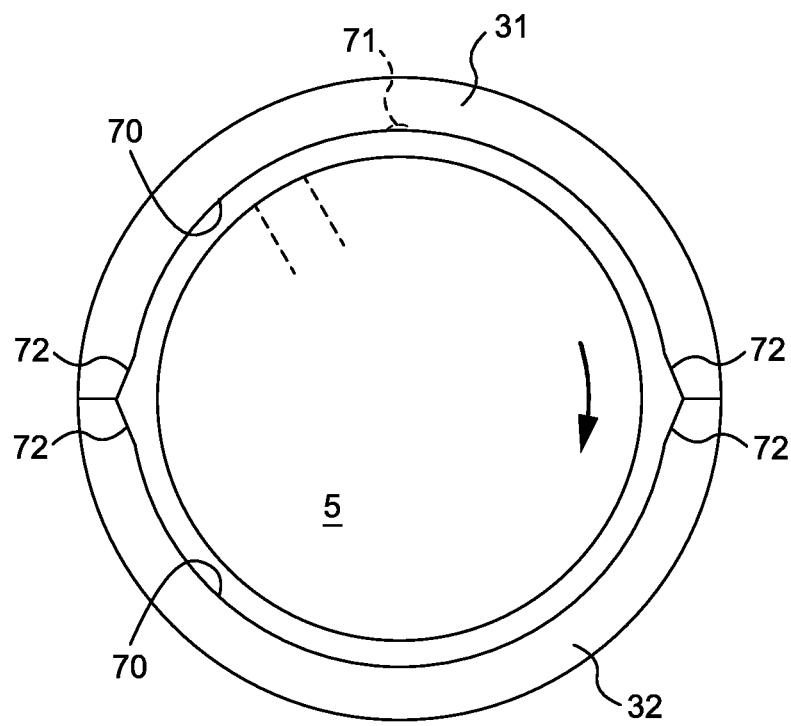
FIG. 16 is a view in which a pair of half bearings according to a fourth embodiment of the present invention and a crankpin are seen from the axial direction.
Figure 17:
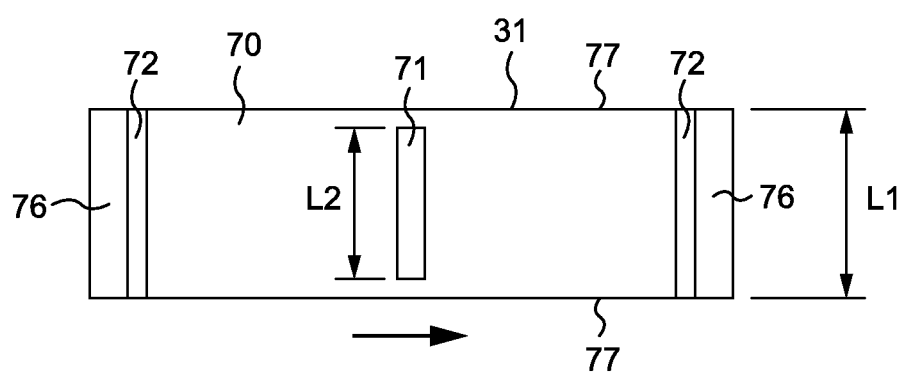
FIG. 17 is a plan view in which the half bearing illustrated in FIG. 16 is seen from the inner circumferential surface side.

FIGS. 16 and 17 illustrate an embodiment in which the axial groove 71 does not reach the axial end surface 77 of the half bearing 31, and the axial groove 71 is blocked in the axial direction. Thus, excessive discharge of oil is prevented.

It should be noted that in FIG. 17, the circumferential narrow groove 71C and the axial narrow groove 71A are omitted, and not illustrated. Although one axial groove 71 is drawn in FIGS. 16 and 17, this is mere one example, and the configuration that is blocked in the axial direction can also be applied to any of the embodiments described above. In the present embodiment, the axial groove 71 is formed in such a way that the center of its axial length L2 coincides with the center of an axial length L1 of the half bearing 31. Moreover, the axial groove 71 is preferably formed in such a way that its axial length L2 is 70% to 95% of the axial length L1 of the half bearing 31.

In the present embodiment, the circumferential narrow groove 71C is formed in such a way that the depth DC thereof from the groove surface 71S of the axial groove 71 is constant over the extending direction (longitudinal direction) of the circumferential narrow groove 71C except for a circumferential end, and the width WC is constant over the extending direction of the circumferential narrow groove 71C. It should be noted that the sectional shape of the circumferential narrow groove 71C is preferably U-shaped, but is not limited to a U-shape, and may have any other shape.

However, the depth DC or the width WC of the circumferential narrow groove 71C may vary along the extending direction of the circumferential narrow groove 71C. In this case, the depth DC and the width WC of the circumferential narrow groove 71C have the maximum groove depth and the maximum groove width of the circumferential narrow groove 71C, the maximum values of which are preferably within the dimensional range described above.

Although the above description has been given using an example in which the half bearing according to the present invention is applied to a connecting rod bearing that bears a crankpin of a crankshaft of an internal combustion engine, the half bearing according to the present invention can also be applied to one or both of a pair of half bearings constituting a main bearing that bears a journal portion of the crankshaft. Moreover, the half bearing may further have, for example, an oil hole or an oil groove, and have, on the entire slide surface except for the axial groove 71, a plurality of microgroove portions extending in the circumferential direction of the half bearing.

The invention claimed is:

1. A half bearing having a semi-cylindrical shape and adapted to constitute a sliding bearing for supporting a crankshaft of an internal combustion engine, the half bearing comprising at least one first axial groove formed on an inner circumferential surface thereof, the at least one first axial groove comprising a groove surface formed back away from the inner circumferential surface toward a radially outer side of the half bearing, the groove surface defining a convex curve toward the radially outer side in a cross-section perpendicular to an axial direction of the half bearing and defining a straight line extending in the axial direction in a cross-section parallel to the axial direction, wherein the half bearing further comprises a plurality of circumferential grooves and a plurality of second axial grooves that are formed on the groove surface so as to be back away from the groove surface toward the radially outer side, the plurality of circumferential grooves and the plurality of second axial grooves extending in a circumferential direction and the axial direction of the half bearing, respectively, so as to cross each other, and a depth of each second axial groove from the groove surface is greater than a depth of each circumferential groove from the groove surface, and a width of each second axial groove on the groove surface is greater than a width of each circumferential groove on the groove surface.

2. The half bearing according to claim 1, wherein a depth of the at least one first axial groove from the inner circumferential surface is 2 to 50 µm.

3. The half bearing according to claim 2, wherein the depth of each circumferential groove from the groove surface is 0.05 to 3 µm, the width of each circumferential groove on the groove surface is 5 to 85 µm, and a pitch of each circumferential grooves is 5 to 100 µm.

4. The half bearing according to claim 2, wherein the depth of each second axial groove from the groove surface of the at least one first axial groove is 0.3 to 10 µm, the width of each second axial groove on the groove surface is 10 to 150 µm, and a pitch of each second axial grooves is 10 to 200 µm.

5. The half bearing according to claim 1, wherein the at least one first axial groove comprises a plurality of first axial grooves, and the plurality of first axial grooves are formed on the inner circumferential surface.

6. The half bearing according to claim 5, wherein the plurality of first axial grooves are formed substantially at equal intervals in the circumferential direction.

7. The half bearing according to claim 1, wherein the at least one first axial groove does not open at any axial end surface of the half bearing.

8. A cylindrical sliding bearing for supporting a crankshaft of an internal combustion engine, comprising the half bearing according to claim 1.

9. The cylindrical sliding bearing according to claim 8, including a pair of the half bearings.

* * * * *